United States Patent [19]

Brazdil, Jr. et al.

[11] Patent Number: 5,693,587
[45] Date of Patent: Dec. 2, 1997

[54] METHOD FOR PREPARING VANADIUM ANTIMONY OXIDE BASED OXIDATION AND AMMOXIDATION CATALYSTS

[75] Inventors: James F. Brazdil, Jr., Highland Heights; Fernando A. P. Cavalcanti, South Euclid; Joseph P. Padolewski, Akron, all of Ohio

[73] Assignee: The Standard Oil Company, Cleveland, Ohio

[21] Appl. No.: 469,980

[22] Filed: Jun. 6, 1995

[51] Int. Cl.$^6$ ...................................... B01J 23/70
[52] U.S. Cl. ................ 502/353; 502/325; 502/338; 502/349; 502/350; 502/354
[58] Field of Search ................... 502/325, 338, 502/349, 350, 353, 354

[56] References Cited

U.S. PATENT DOCUMENTS

| | | | |
|---|---|---|---|
| 31,364 | 8/1861 | Wise | 252/456 |
| 4,746,641 | 5/1988 | Guttmann et al. | 502/202 |

Primary Examiner—Thurman K. Page
Assistant Examiner—Kathryne E. Shelborne
Attorney, Agent, or Firm—Michael F. Esposito; David J. Untener

[57] ABSTRACT

A method of making a promoted vanadium antimony oxide catalyst comprising reacting a monoperoxovanadium ion while in aqueous solution with the antimony compound wherein the improvement comprises adding the antimony compound to the aqueous slurry in at least two steps.

8 Claims, No Drawings

METHOD FOR PREPARING VANADIUM ANTIMONY OXIDE BASED OXIDATION AND AMMOXIDATION CATALYSTS

BACKGROUND OF THE INVENTION

Field of the Invention

The present invention is directed to a process for the manufacture of a $VSbO_x$ based catalyst useful in the ammoxidation of a $C_3$–$C_5$ paraffinic hydrocarbon to its corresponding α,β-unsaturated nitrile ammoxidation of propylene with $NH_3$ and oxygen to acrylonitrile, ammoxidation of methylpyridine with $NH_3$ and oxygen to make cyanopyridine, the ammoxidation of m-xylene with $NH_3$ and oxygen to make isophthalonitrile and the oxidation of o-xylene to make phthalic anhydride. In particular, the present invention is directed to a process for the manufacture of $VSbO_x$ based catalyst (preferably promoted with other metals) useful in the ammoxidation of propane to acrylonitrile.

Great Britain Patent Nos. 1,336,135 and 1,336,136 disclose making catalyst from $V_2O_5$ and $Sb_2O_5$ slurries that are mixed, dried and calcined. These catalysts are used to ammoxidize alkanes such as propane. U.S. Pat. No. 3,860,534 has similar disclosures but uses calcined catalyst washed with water before use to remove soluble vanadium compounds. The dried and calcined material in the above references are relatively weak and have low abrasion resistance. More importantly, the material in the dried state is a fine talcum powder-like material not possible to spray dry to obtain microspheroidal particles large enough for a fluid bed catalyst.

U.S. Pat. Nos. 4,784,979; 4,879,264 and 5,094,989, assigned to the assignee of the instant application, are directed to the specific procedure for the preparation of $VSbO_x$ based catalyst (promoted with other metals) useful in the fluid bed reactors for the ammoxidation of propane to acrylonitrile. While the processes disclosed in these patents produces good ammoxidation catalyst for use in the fluid bed process, they may be improved upon. The present invention is directed to such an improvement.

SUMMARY OF THE INVENTION

It is the primary object of the present invention to provide an improved method for making a hard, attrition-resistant catalyst containing V and Sb in the oxide form ($VSbO_x$).

Another object of the present invention is to provide a process of making microspheroidal catalyst containing V and Sb in oxide form.

In a still further object of the present invention the $VSbO_x$ catalyst is promoted with various metals.

Other objects as well as aspects, features and advantages of the present invention will become apparent from a study of the accompanying disclosure and the appended claims.

In order to achieve the foregoing aspects, features and advantages of the present invention, there is provided a method of making a catalyst having the following empirical formula:

$$VSb_mA_aD_dO_x$$

where

A=Sn, Ti or mixtures thereof,

D=at least one element selected from Li, Mg, Na, Ca, Sr, Ba, Co, Fe, Cr, Ga, Ni, Zn, Ge, Nb, Mo, W, Cu, Ti, Ta, Se, Bi, Ce, In, As, B, Al, and Mn, and wherein m=0.5 to 10 a=0 to 10 d=0 to 10 x=number of oxygen atoms necessary to satisfy the valency requirements of the other elements, comprising reacting a monoperoxovanadium ion, $VO(O_2)^+$, while in aqueous solution with a first portion of an Sb compound which contains Sb, having a valence of $3^+$, thereby reducing the average valence of the V to less than $5^+$ and oxidizing Sb to a valence state of $5^+$, removing the water from the solution to form a dried catalyst precursor, and calcining the resulting dried precursor at a temperature in the range of 650° to 950° C. to form the catalyst, wherein the improvement comprises adding at least a second portion of an Sb compound after the first portion of Sb compound has been added and has at least partially reacted with the monoperoxovanadium ion.

In a preferred embodiment of the process of the present invention the second portion of Sb compound is added after the first portion of the Sb compound has completely reacted with the monoperoxovanadium ion.

In still another preferred embodiment of the process of the present invention the first and second portions of the Sb compound added to the catalyst are selected to be the same Sb compound.

In a further preferred embodiment of the process of the present invention the first and second portions of the Sb compound are selected from different compounds.

In a still further preferred embodiment of the present invention the second portion of Sb compound is added prior to removing the water to form the dried catalyst precursor.

In another preferred embodiment of the present invention the second portion of the Sb compound is added subsequent to removing the water to form the dried catalyst precursor.

In still another preferred embodiment of the present invention the second portion of Sb compound is added after the dried precursor has been calcined.

Other objects, advantages and novel features of the invention will be apparent to those of ordinary skill in the art upon examination of the following detailed description of the preferred embodiments of the invention.

DETAILED DESCRIPTION OF THE INVENTION

The process of the present invention comprises a method of making a $VSbO_x$ based catalyst suitable for the ammoxidation of propane to acrylonitrile. In particular, the process of the present invention comprises preparing a catalyst having the following formula:

$$VSb_mA_aD_dO_x$$

where

A=Sn, Ti or mixtures thereof,

D=at least one element selected from Li, Mg, Na, Ca, Sr, Ba, Co, Fe, Cr, Ga, Ni, Zn, Ge, Nb, Mo, W, Cu, Ti, Ta, Se, Bi, Ce, In, As, B, Al, and Mn, and wherein m=0.5 to 10 a=0 to 10 d=0 to 10 x=number of oxygen atoms necessary to satisfy the valency requirements of the other elements, by reacting a VO(O$_2$)$^+$ ion while in aqueous solution with a first portion of an Sb compound containing Sb in the valence state of 3$^+$, thereby reducing the average valence of the V ion to less than 5$^+$ and oxidizing Sb to a valence state of 5$^+$, removing the water from the solution to form a dried catalyst precursor, calcining the resulting dried precursor at a maximum temperature in the range of 650° to 950° C. wherein the improvement comprises adding at least a second portion of an Sb compound after the first portion has at least partially reacted with the VO(O$_2$)$^+$ ion.

Preferably, the calcination of the catalyst precursor is done at a temperature of between 700° to 875° C., most preferably in the range of 750° to 850° C.

In a further preferred embodiment, the water is removed by spray drying at a temperature of between 110° to 190° C., especially preferred being 115° to 175° C., providing particles that are microspheroidal in shape in the range of 10 to 200μ, especially preferred being 25 to 150μ.

The V compound reacted in the process of the present invention can be an inorganic or an organic compound of V, but is usually an inorganic compound. A partial list of such compounds includes any oxide of V such as $V_2O_5$, $V_7O_{13}$, VO, $VO_2$, etc. For a more detailed list of typical compounds utilized in the practice of the present invention, see U.S. Pat. Nos. 4,784,979 and 4,879,264, herein incorporated by reference. The preferred V compound used in the reaction with the hydrogen peroxide is one of the oxides, preferably because of cost, $V_2O_5$ is the compound of choice. Antimony compound reactants chosen to react with the VO(O$_2$)$^+$ in making the catalyst of the present invention are also set forth in detail in U.S. Pat. Nos. 4,784,979 and 4,879,264, herein incorporated by reference. A partial list of these compounds includes such Sb oxides such as $Sb_2O_3$ and $Sb_2O_4$ and antimony halides such as $SbBr_3$, and $SbCl_3$. Other antimony compounds suitable for addition to the catalyst are the reaction product of $Sb_2O_3$ refluxed with nitric acid, antimony oxide sol, antimony metal and the hydrolysis product of the reaction of $Sb_2O_3$, $SbCl_3$ and $SbCl_5$ with water or mixtures thereof.

Optionally, the catalyst prepared by the present invention may be activated by contacting the catalyst with an hydroxy compound in liquid form and thereafter drying the catalyst. The particular hydroxy compound selected is typically isobutanol, cyclohexanol, cyclopentanol, etc. For specifics as to the activation procedure suitable for the process of the present invention, see U.S. Pat. No. 5,094,989 assigned to the assignee of the present invention, herein incorporated by reference.

The examples set forth below are for illustrative purposes only and provide a detailed description of the process of the present invention.

COMPARATIVE EXAMPLE A

A catalyst having the composition VSb$_{1.4}$Sn$_{0.2}$Ti$_{0.1}$O$_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 61.22 g of $Sb_2O_3$ was added followed by 2.40 g of TiO$_2$ powder (Degussa P-25). The beaker was covered with a watch glass and the mixture was stirred and heated for about three hours. 99.25 g of 9.11 wt % SnO$_2$ sol (Nalco Chemical Co.) were added to the foregoing dispersion. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C., then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I, below.

COMPARATIVE EXAMPLE B

A catalyst having the composition VSb$_{1.4}$Sn$_{0.2}$Ti$_{0.1}$O$_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 61.22 g of $Sb_2O_3$ was added, followed by 2.40 g of TiO$_2$ powder (Degussa P-25). The beaker was covered with a watch glass and the mixture was stirred and heated for about three hours. 99.25 g of 9.11 wt % SnO$_2$ sol (Nalco Chemical Co.) were added to the foregoing dispersion. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The catalyst was washed with refluxing isobutanol using a Soxhlet extractor.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 1

A catalyst having the composition VSb$_{1.4}$Sn$_{0.2}$Ti$_{0.1}$O$_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 61.22 g of $Sb_2O_5$ was added followed by 2.40 g of TiO$_2$ powder (Degussa P-25). The beaker was covered with a watch glass and the mixture was stirred and heated for about three hours. 99.25 g of 9.11 wt % SnO$_2$ sol (Nalco Chemical Co.) were added to the foregoing dispersion. 4.37 g of $Sb_2O_3$ were refluxed in 250 ml of concentrated nitric acid for about three hours. The mixture was filtered and the residue washed with water to remove the remaining acid. The resulting washed solid was then added to the foregoing catalyst dispersion. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a 3/8 inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 2

A catalyst having the composition $VSb_{1.4}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 61.22 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 4.37 g of $Sb_2O_3$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a 3/8 inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 3

A catalyst having the composition $VSb_{1.4}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 61.22 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 8.75 g of $Sb_2O_3$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a 3/8 inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 4

A catalyst having the composition $VSb_{1.4}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 61.22 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 13.12 g of $Sb_2O_3$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a 3/8 inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 5

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion. 4.37 g of $Sb_2O_3$ were refluxed in 250 ml of concentrated nitric acid for about three hours. The mixture was filtered and the residue washed with water to remove the remaining acid. The resulting washed solid was then added to the foregoing catalyst dispersion. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 6

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 4.37 g of $Sb_2O_3$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 600° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 7

A catalyst having the composition $VSb_{1.3}Sn_{0.2}Ti_{0.1}O_x$ was prepared by mixing 27.28 g of $V_2O_5$ powder with a solution consisting of 100 ml of 30 % $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 4.37 g of $Sb_2O_3$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 8

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 8.75 g of $Sb_2O_3$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 9

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 13.12 g of $Sb_2O_3$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 10

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 4.37 g of $Sb_2O_3$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 700° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 11

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 4.61 g of $Sb_2O_4$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 12

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion. 4.37 g of $Sb_2O_3$ were heated in a hydrogen peroxide solution, dried, then added to the foregoing catalyst dispersion. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 13

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion. 4.37 g of $Sb_2O_3$ were added to 100 ml of water and heated. A solution of 50% hydrogen peroxide solution was added until a colloidal suspension resulted which had no evidence of particle settling when mixing was stopped. This colloidal suspension was then added to the foregoing catalyst dispersion. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C. then at 650° C. for an additional 3 hours.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

EXAMPLE 14

A catalyst having the composition $VSb_{1.3}Sn_{0.2}Ti_{0.1}O_x$ was prepared by mixing 27.28 g of $V_2O_5$ powder with a solution consisting of 100 ml of 30% $H_2O_2$ in 900 ml of water in a two liter beaker. After reaction of the $V_2O_5$ powder was complete, 56.85 g of $Sb_2O_3$ was added followed by 2.40 g of $TiO_2$ powder (Degussa P-25). The beaker was covered with a watch glass and the mixture was stirred and heated for about three hours. 99.25 g of 9.11 wt % $SnO_2$ sol (Nalco Chemical Co.) were added to the foregoing dispersion followed by 4.61 g of $Sb_2O_4$. The mixture was stirred in an uncovered beaker with heating in order to reduce the volume by evaporation of water. When the mixture could no longer be stirred, it was dried in an oven at 120° C. Thereafter, it was calcined for 8 hours at 650° C., cooled and then crushed and sieved and the 20–35 mesh particles collected. A portion of this was calcined for 3 hours at 810° C.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

7 g of the foregoing washed catalyst were physically mixed with 0.3027 g of $Sb_2O_3$ powder in a 50 ml flask until the catalyst particles appeared uniformly coated by the $Sb_2O_3$ powder. The coated catalyst particles were then calcined for 3 hours at 650° C.

The calcined catalyst was then contacted with isobutanol using about 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through the funnel without suction. This washing was done a total of three times. After the last of the isobutanol was passed through the funnel, the catalyst was heated in an oven at 120° C. to remove the residual isobutanol on the catalyst.

The catalyst was used to ammoxidize propane using a ⅜ inch O.D. titanium metal fixed bed reactor equipped with a preheat leg and immersed in a temperature controlled molten salt bath at 480° C. The feed to the reactor consisted of propane, ammonia, oxygen, nitrogen, and water in the ratio of 3/1.2/3/10/2. The results are shown in Table I below.

TABLE I

MULTI-STAGE ANTIMONY/ANTIMONATE ADDITION

| | Base Catalyst Composition | Additional Antimony Amount and Source | Contact Time(sec) | Conv. % | AN Sel % |
|---|---|---|---|---|---|
| Comp. Ex. A | $VSb_{1.4}Sn_{0.2}Ti_{0.1}O_x$ | None | 4.18 | 30.55 | 58.29 |
| Comp. Ex. B | $VSb_{1.4}Sn_{0.2}Ti_{0.1}O_x$ | None | 4.03 | 30.84 | 57.83 |
| Example 1A | $VSb_{1.4}Sn_{0.2}Ti_{0.1}O_x$ | $Sb_{0.1}(Sb_2O_3/HNO_3)$ | 4.53 | 31.86 | 58.75 |
| Example 1B | | | 3.22 | 29.92 | 59.22 |
| Example 2 | $VSb_{1.4}Sn_{0.2}Ti_{0.1}O_x$ | $Sb_{0.1}(Sb_2O_3)$ | 3.40 | 29.80 | 59.39 |
| Example 3 | $VSb_{1.4}Sn_{0.2}Ti_{0.1}O_x$ | $Sb_{0.2}(Sb_2O_3)$ | 3.62 | 30.67 | 59.47 |
| Example 4 | $VSb_{1.4}Sn_{0.2}Ti_{0.1}O_x$ | $Sb_{0.3}(Sb_2O_3)$ | 3.04 | 29.48 | 59.17 |

TABLE I-continued

MULTI-STAGE ANTIMONY/ANTIMONATE ADDITION

| | Base Catalyst Composition | Additional Antimony Amount and Source | Contact Time(sec) | Conv. % | AN Sel % |
|---|---|---|---|---|---|
| Example 5 | $VSb_{1.3}Sn_{0.2}Ti_{0.1}O_x$ | $Sb_{0.1}(Sb_2O_3/HNO_3)$ | 3.24 | 29.97 | 58.75 |
| Example 6 | $VSb_{1.3}Sn_{0.2}Ti_{0.1}O_x$ | $Sb_{0.1}(Sb_2O_3)$ | 3.54 | 30.57 | 59.31 |
| Example 7 | $VSb_{1.3}Sn_{0.2}Ti_{0.1}O_x$ | $Sb_{0.1}(Sb_2O_3)$ | 2.92 | 29.77 | 60.02 |
| Example 8 | $VSb_{1.3}Sn_{0.2}Ti_{0.1}O_x$ | $Sb_{0.2}(Sb_2O_3)$ | 3.36 | 30.38 | 58.43 |
| Example 9 | $VSb_{1.3}Sn_{0.2}Ti_{0.1}O_x$ | $Sb_{0.3}(Sb_2O_3)$ | 3.21 | 29.92 | 59.49 |
| Example 10 | $VSb_{1.3}Sn_{0.2}Ti_{0.1}O_x$ | $Sb_{0.1}(Sb_2O_3)$ | 4.05 | 30.03 | 59.92 |
| Example 11 | $VSb_{1.3}Sn_{0.2}Ti_{0.1}O_x$ | $Sb_{0.1}(Sb_2O_4)$ | 3.66 | 30.06 | 59.65 |
| Example 12 | $VSb_{1.3}Sn_{0.2}Ti_{0.1}O_x$ | $Sb_{0.1}(Sb_2O_3/H_2O_2/dry)$ | 4.15 | 29.94 | 59.71 |
| Example 13 | $VSb_{1.3}Sn_{0.2}Ti_{0.1}O_x$ | $Sb_{0.1}(Sb_2O_3/H_2O_2/sol)$ | 7.88 | 28.99 | 59.54 |
| Example 14 | $VSb_{1.3}Sn_{0.2}Ti_{0.1}O_x$ | $Sb_{0.1}(Sb_2O_4)$ + $Sb_{0.1}(Sb_2O_3$ phys. mix) | 3.67 | 29.72 | 60.18 |

What we claim as our invention is:

1. A method of making a catalyst having the following empirical formula:

$$VSb_mA_aD_dO_x$$

where

A=Sn, Ti or mixtures thereof,

D=at least one element selected from Li, Mg, Na, Ca, Sr, Ba, Co, Fe, Cr, Ga, Ni, Zn, Ge, Nb, Mo, W, Cu, Ti, Ta, Se, Bi, Ce, In, As, B, Al, and Mn, and wherein m=0.5 to 10 a=0 to 10 d=0 to 10 x=number of oxygen atoms necessary to satisfy the valency requirements of the other elements, comprising reacting a monoperoxovanadium ion, $VO(O_2)^+$, while in aqueous solution with a first portion of an Sb compound which contains Sb, having a valence of $3^+$, thereby reducing the average valence of the V to less than $5^+$ and oxidizing Sb to a valence state of $5^+$, removing the water from the solution to form a dried catalyst precursor, and calcining the resulting dried precursor at a temperature in the range of 650° to 950° C. to form the catalyst, wherein the improvement comprises adding at least a second portion of an Sb compound after the first portion of Sb compound has been added and has at least partially reacted with the monoperoxovanadium ion.

2. The process of claim 1 wherein the second portion of the Sb compound is added after the first portion of the Sb compound has completely reacted with the monoperoxovanadium ion.

3. The process of claim 1 wherein the first and second portions of the Sb compound added to the catalyst are selected to be the same Sb compound.

4. The process of claim 1 wherein the first and second portions of the Sb compound are selected from different compounds.

5. The process of claim 1 wherein the second portion of the Sb compound is added prior to removing the water to form the dried catalyst precursor.

6. The process of claim 1 wherein the second portion of the Sb compound is added subsequent to removing the water to form the dried catalyst precursor.

7. The process of claim 1 wherein the second portion of Sb compound is added after the dried precursor has been calcined.

8. The process of claim 1 wherein the water is removed by drying at a temperature of between about 110° C. to 190° C.

* * * * *